US012468203B2

(12) United States Patent
Hirosawa

(10) Patent No.: US 12,468,203 B2
(45) Date of Patent: Nov. 11, 2025

(54) DISPLAY APPARATUS AND COUNTER SUBSTRATE

(71) Applicant: Magnolia White Corporation, Tokyo (JP)

(72) Inventor: Jin Hirosawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/734,172

(22) Filed: Jun. 5, 2024

(65) Prior Publication Data

US 2024/0427207 A1 Dec. 26, 2024

(30) Foreign Application Priority Data

Jun. 20, 2023 (JP) ................................ 2023-100745

(51) Int. Cl.
*G02F 1/1362* (2006.01)
*G02F 1/1368* (2006.01)

(52) U.S. Cl.
CPC ...... *G02F 1/1368* (2013.01); *G02F 1/136222* (2021.01)

(58) Field of Classification Search
CPC ....... G02F 2001/136222; G02F 1/1368; G02F 1/133502
See application file for complete search history.

(56) References Cited

U.S. PATENT DOCUMENTS

| 10,379,409 B2 | 8/2019 | Adachi |
| 2006/0023128 A1* | 2/2006 | Choo ................ G02F 1/133536 349/1 |
| 2006/0238685 A1* | 10/2006 | Shibasaki ........... G02F 1/13363 349/119 |
| 2017/0052287 A1* | 2/2017 | Lee ......................... G02B 3/005 |
| 2018/0301665 A1* | 10/2018 | Sakamoto ............. H10K 59/12 |
| 2019/0013495 A1* | 1/2019 | Kim ..................... H10K 50/858 |
| 2023/0118579 A1* | 4/2023 | Nakano ............ G02F 1/133634 349/95 |
| 2024/0302690 A1* | 9/2024 | Tang ................. G02F 1/136227 |

FOREIGN PATENT DOCUMENTS

JP 2017-203849 A 11/2017

* cited by examiner

*Primary Examiner* — Jonathan Y Jung
(74) *Attorney, Agent, or Firm* — Michael Best & Friedrich LLP

(57) ABSTRACT

Performance of a display apparatus is improved. A display apparatus includes: an array substrate including a switching element; and a counter substrate facing the array substrate. In this case, the counter substrate includes: a substrate having a light transmitting property; and an overcoat film being in contact with the substrate, and the overcoat film is made of a plurality of types of films having different refractive indexes.

4 Claims, 15 Drawing Sheets

DISPLAY APPARATUS AND COUNTER SUBSTRATE

CROSS-REFERENCE TO RELATED APPLICATION

The present application claims priority to Japanese Patent Application No. 2023-100745 filed on Jun. 20, 2023, the disclosure of which is incorporated herein by reference.

TECHNICAL FIELD OF THE INVENTION

The present invention relates to a display apparatus and a counter substrate.

BACKGROUND OF THE INVENTION

Japanese Patent Application Laid-open Publication No. 2017-203849 (Patent Document 1) discloses a technique for preventing color mixing and luminance decrease and preventing contamination of liquid crystal. Specifically, the Patent Document 1 discloses a technique of arranging a light shielding layer to be close to an array substrate by using a first light transmitting resin layer and a second light transmitting resin layer.

SUMMARY OF THE INVENTION

For example, types of display apparatuses include a display apparatus used in an application case in which widening of a viewing angle is desirable and a display apparatus used in an application case in which the widening of the viewing angle is not required so much. Such a display apparatus used in the application case in which the widening of the viewing angle is not required as described above has a room to be improved by a devisal for preferentially improving other performances than the widening of the viewing angle.

A display apparatus according to an embodiment includes: an array substrate including a switching element; and a counter substrate facing the array substrate. In this case, the counter substrate includes: a substrate having a light transmitting and an overcoat film being in contact with the property; substrate, and the overcoat film is made of a plurality of types of films having different refractive indexes.

A counter substrate according to an embodiment is a component of the display apparatus. In this case, the counter substrate includes: a substrate having a light transmitting property; and an overcoat film being in contact with the substrate, and the overcoat film is made of a plurality of types of films having different refractive indexes.

BRIEF DESCRIPTIONS OF THE DRAWINGS

DESCRIPTIONS OF THE PREFERRED EMBODIMENTS

Figure 1:
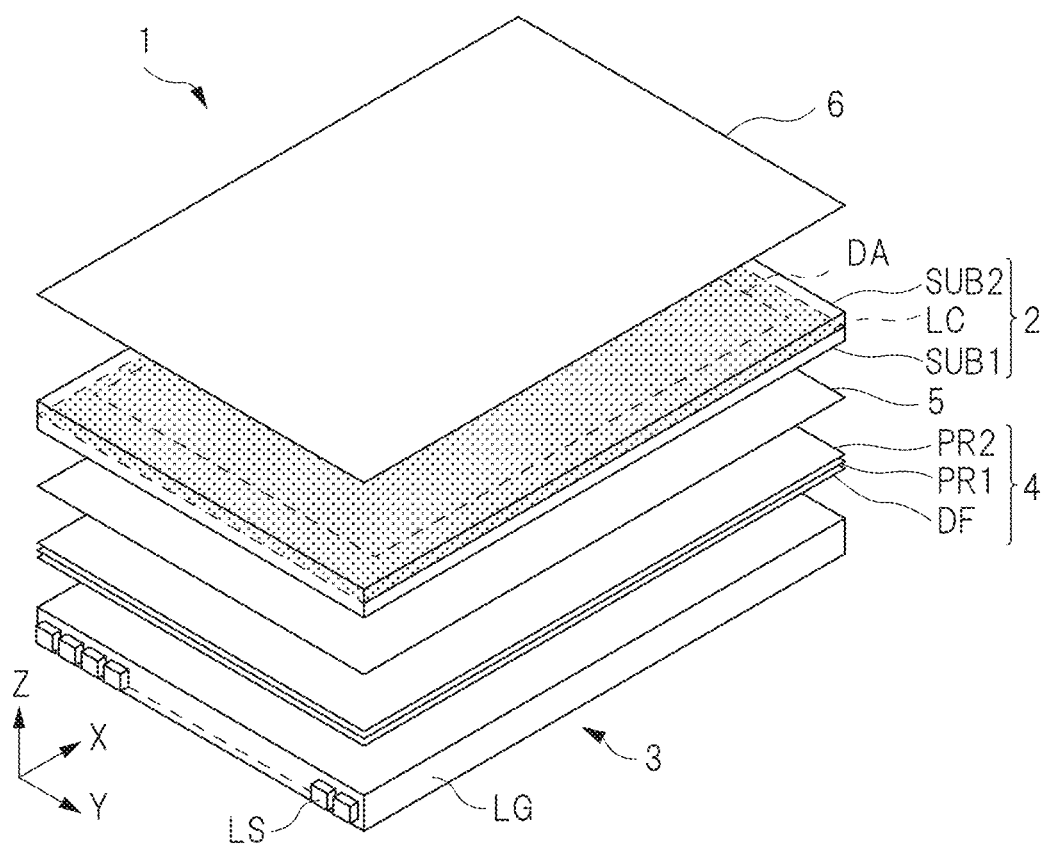
FIG. 1 is an exploded perspective view illustrating a schematic configuration example of a liquid crystal display apparatus.

Hereinafter, embodiments will be explained with reference to the drawings.

Note that the present disclosure is only one example, and appropriate modification with keeping the idea of the present invention which can be anticipated by those who are skilled in the art is obviously within the scope of the present disclosure.

Also, in order to make the explanation clearer, a width, a thickness, a shape, and others of each portion in the drawings are schematically illustrated more than those in an actual aspect in some cases. However, the illustration is only one example, and does not limit the interpretation of the present disclosure. In the present specification and each drawing, similar elements to those illustrated in the already-described drawings are denoted with the same reference characters, and detailed explanation for them is appropriately omitted in some cases.

In the present embodiment, for example, a liquid crystal display apparatus including a liquid crystal display element is disclosed. However, the embodiment does not prevent the application of the technical idea disclosed in the embodiment to a display apparatus including another type of display element represented by, for example, an organic electroluminescence display element, a micro LED, or a mini LED. In addition, the technical idea disclosed in the embodiment is also applicable to an electronic device or an array substrate including a sensor element represented by a capacitive sensor, an optical sensor, or the like.

<Overall Configuration of Liquid Crystal Display Apparatus>

FIG. 1 is an exploded perspective view illustrating a schematic configuration example of a liquid crystal display apparatus 1. As illustrated in FIG. 1, an X direction, a Y direction, and a Z direction are defined. The X direction, the Y direction, and the Z direction are directions orthogonal to one another, but may intersect one another at an angle other than a vertical angle. Viewing the liquid crystal display apparatus 1 and components thereof in parallel with the Z direction is referred to as "plan view". In addition, the direction indicated by the arrow of the Z direction may be referred to as "upper side", and the opposite direction may be referred to as "lower side".

In FIG. 1, the liquid crystal display apparatus 1 includes a display panel 2 and a backlight 3. For example, the backlight 3 can be made of a side-edge-type backlight including a light guide body LG facing the display panel 2 and a plurality of light emitting elements LS arranged at positions facing a side surface of the light guide body LG. However, the backlight 3 is not limited to this example, and a backlight with various configurations that can supply light required for image display can be adopted.

The planar shape of each of the display panel 2 and the light guide body LG is made of, for example, a rectangular shape having a long side along the X direction and a short side along the Y direction, but is not limited to the rectangular shape, and may be made of another shape.

The display panel 2 is a liquid crystal panel having light transmitting property, and includes, for example, an array substrate SUB1, a counter substrate SUB2 facing the array substrate SUB1, and a liquid crystal layer LC filling to seal a gap between the array substrate SUB1 and the counter substrate SUB2. The display panel 2 configured as described above includes, for example, a rectangular display region DA.

The liquid crystal display apparatus 1 further includes an optical sheet group 4, a polarizer 5 and a polarizer 6. The optical sheet group 4 is arranged between the light guide body LG and the display panel 2. For example, the optical sheet group 4 includes a diffusion sheet DF that diffuses light emitted from the light guide body LG and a prism sheet PR1 and a prism sheet PR2 each including a large number of prisms formed therein.

The polarizer 5 is arranged between the optical sheet group 4 and the array substrate SUB1. On the other hand, the polarizer 6 is arranged on the upper side of the counter substrate SUB2. Here, a relationship between a polarization axis of the polarizer 5 and a polarization axis of the polarizer 6 is a crossed-Nicols relationship in which the polarization axes are orthogonal to each other.

The liquid crystal display apparatus 1 configured as described above can be used for various types of devices represented by, for example, a head mounted display, an in-vehicle device, a smartphone, a tablet terminal device, a mobile phone, a personal computer, a television receiver, and a game device.

<Configuration of Display Panel>

Figure 2:
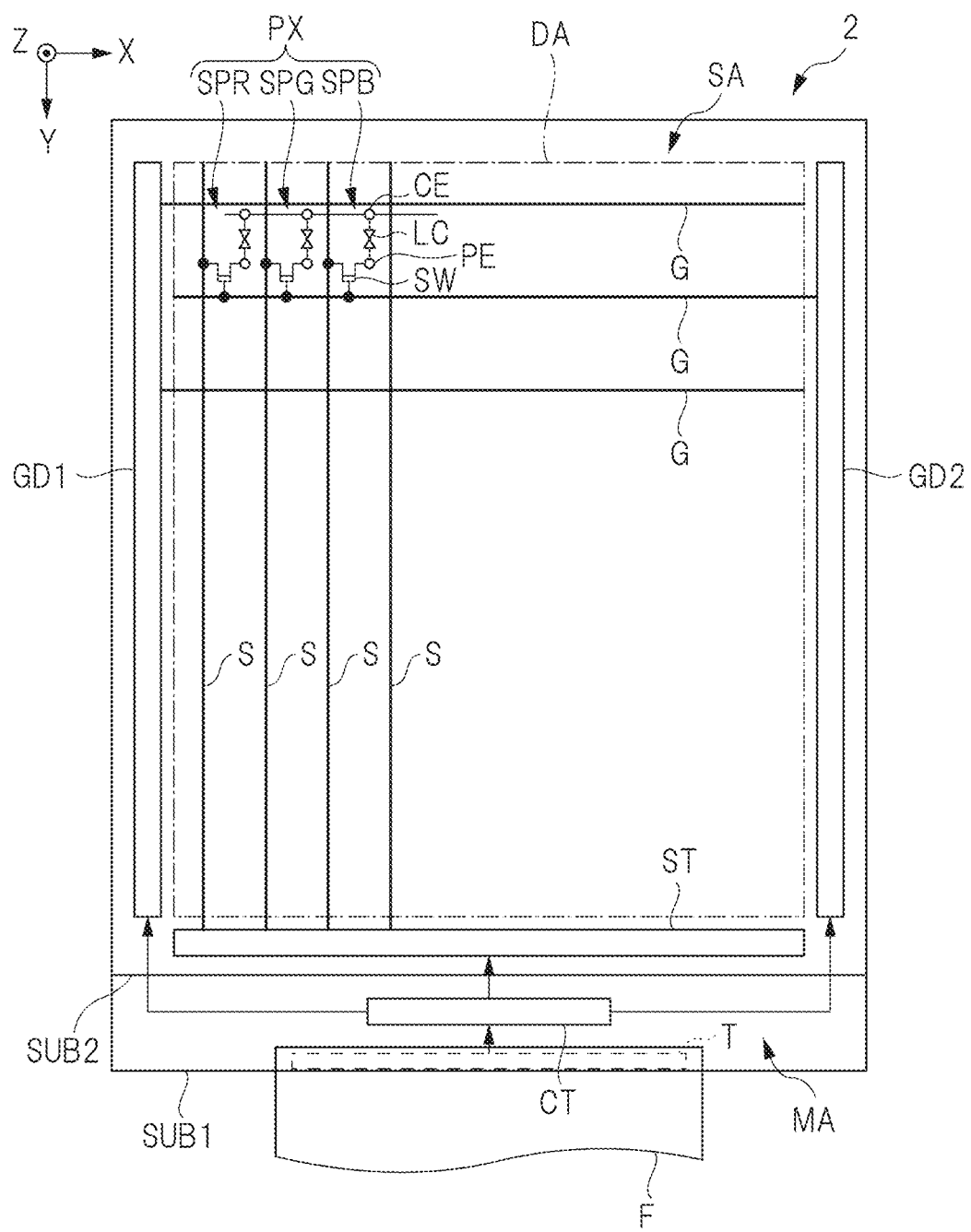
FIG. 2 is a view illustrating an outline configuration of a display panel.

Next, a configuration of the display panel 2 will be explained. FIG. 2 is a plan view illustrating an outline configuration of the display panel 2. In FIG. 2, the display panel 2 includes the display region DA and a peripheral region SA around the display region DA. For example, as illustrated in FIG. 2, a lower side of the array substrate SUB1 protrudes from the counter substrate SUB2 in the Y direction. Thus, the array substrate SUB1 includes a mounting region MA that does not overlap the counter substrate SUB2 in a plan view. The mounting region MA configures a part of the peripheral region SA.

In the display region DA, a plurality of pixels PX are arranged in a matrix pattern. The pixel PX includes a plurality of subpixels. For example, in FIG. 2, the pixel PX includes a red subpixel SPR, a green subpixel SPG, and a blue subpixel SPB. However, the pixel PX is not limited to such a configuration, and may be configured to include subpixels of other colors represented by white.

As illustrated in FIG. 2, the display panel 2 includes a plurality of scan lines G, a plurality of signal lines S (video lines), a scanning driver GD1, a scanning driver GD2, and a selector circuit ST. The plurality of scan lines G extend in the X direction and also are arranged in the Y direction. On the other hand, the plurality of signal lines S extend in the Y direction and also are arranged in the X direction. Each of the plurality of scan line G is connected to the scanning driver GD1 or the scanning driver GD2. On the other hand, each of the plurality of signal lines S is connected to the selector circuit ST.

Next, as illustrated in FIG. 2, a controller CT is mounted on the mounting region MA. In addition, a terminal portion T is provided on the mounting region MA, and a flexible substrate F is connected to the terminal portion T. Note that the controller CT may be mounted on the flexible substrate F. The controller CT is made of, for example, an IC chip or a circuit element.

Various types of signals transmitted from the electronic device on which the liquid crystal display apparatus 1 is mounted are output to the controller CT via an integrated circuit mounted on the flexible substrate F. The controller CT receives such a signal as its input, supplies a video signal to the selector circuit ST, and controls the scanning driver GD1, the scanning driver GD2, and the selector circuit ST.

Each of the scanning driver GD1 and the scanning driver GD2 sequentially supplies the scan signal to the plurality of scan lines G. On the other hand, the selector circuit ST sequentially supplies the video signal input from the controller CT to the signal line S.

The pixel PX is configured to include a pixel electrode PE, a switching element SW (thin film transistor), and a common electrode CE to which a common potential is supplied. The switching element SW is connected to the pixel electrode PE, the scan line G, and the signal line S.

For example, if the switching element SW is made of a thin film transistor (field effect transistor), a gate electrode of the thin film transistor is electrically connected to the scan line G. Further, a source of the thin film transistor is electrically connected to the signal line S while a drain of the thin film transistor is electrically connected to the pixel electrode PE.

Here, by the supply of the scan signal to the scan line G, the thin film transistor is turned on, and the video signal supplied to the signal line S is supplied to the pixel electrode PE. On the other hand, the common electrode CE is formed over the plurality of subpixels, and a potential difference is generated between the pixel electrode PE and the common electrode CE by the supply of the video signal to the pixel electrode PE. As a result of the act of the electric field generated by this on the liquid crystal layer LC, orientation directions of a plurality of liquid crystal molecules configuring the liquid crystal layer LC are controlled.

For example, in a so-called "vertical electric field mode" in which the liquid crystal layer LC is interposed between the pixel electrode PE and the common electrode CE since the pixel electrode PE is formed on the array substrate while the common electrode CE is formed on the counter substrate, the orientation directions of the plurality of liquid crystal molecules configuring the liquid crystal layer LC are controlled by a vertical electric field generated between the pixel electrode PE and the common electrode CE.

On the other hand, for example, in a so-called "transverse electric field mode" in which the pixel electrode PE and the common electrode CE are formed on the array substrate while a transverse electric field (fringe electric field) leaking from a slit in the common electrode CE is used, the orientation directions of the plurality of liquid crystal molecules configuring the liquid crystal layer LC arranged on the upper side of the array substrate are controlled by the transverse electric field leaking from the slit.

As described above, the modes for controlling the orientation directions of the liquid crystal molecules include the "vertical electric field mode" and the "transverse electric field mode". For example, the "transverse electric field mode" has an advantage that the viewing angle can be made wider than that of the "vertical electric field mode". The present embodiment adopts the "transverse electric field mode" in which the scan line G, the signal line S, the scanning driver GD1, the scanning driver GD2, the selector circuit ST, the switching element SW, the pixel electrode PE, and the common electrode CE are formed on the array substrate SUB1.

<Planar Layout Configuration of Subpixels>

Figure 3:
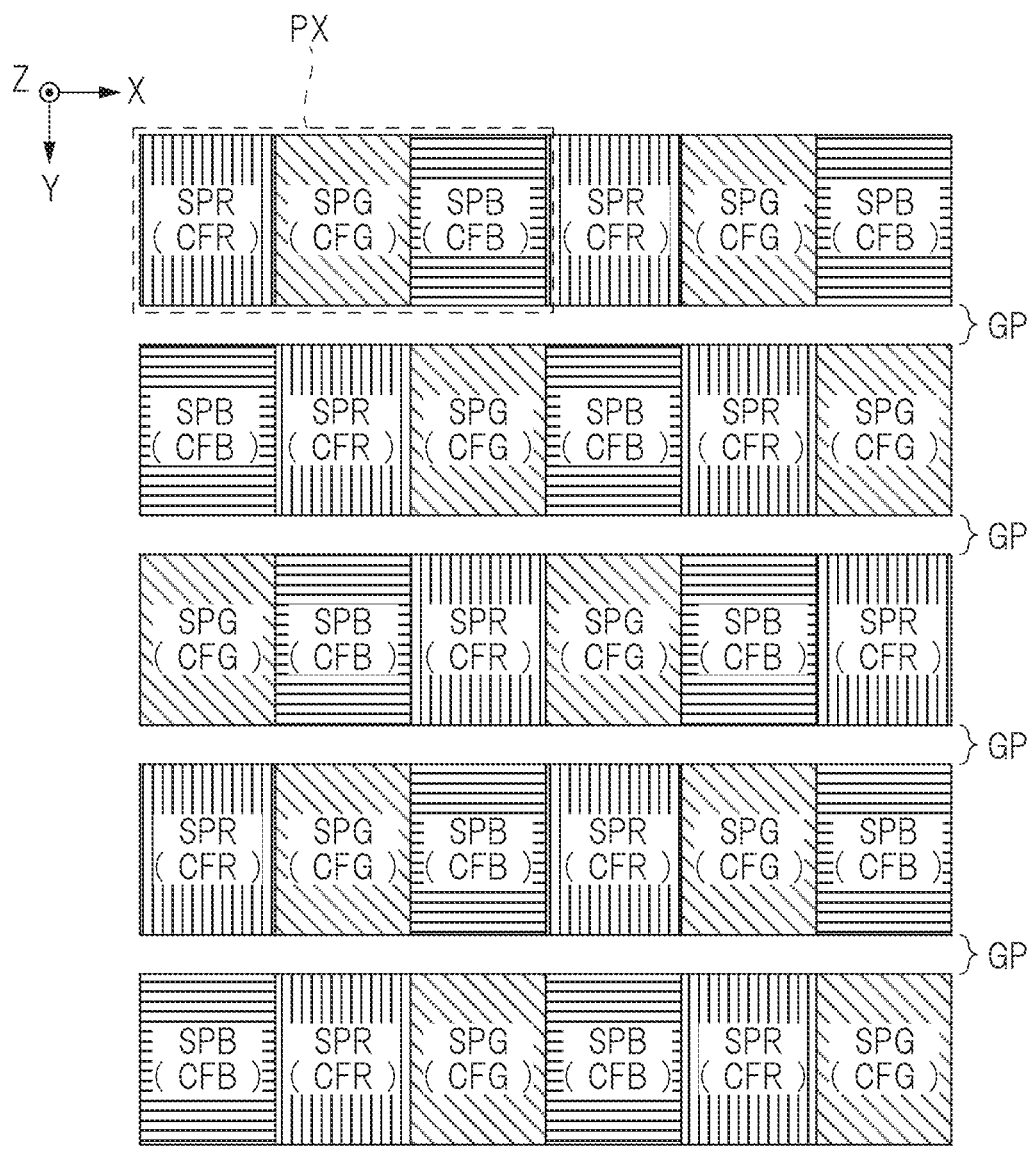
FIG. 3 is a plan view illustrating an example of a planar layout of subpixels.

Next, a planar layout configuration of the subpixels will be explained. FIG. 3 is a plan view illustrating an example of the planar layout of the subpixels. In FIG. 3, the subpixels include a subpixel SPR, a subpixel SPG and a subpixel SPB. A red color filter CFR is arranged in the subpixel SPR, and a green color filter CFG is arranged in the subpixel SPG. Also, a blue color filter CFB is arranged in the subpixel SPB.

As illustrated in FIG. 3, the subpixels SPR, SPG, and SPB are arranged in this order in the X direction. Furthermore, the subpixels SPR, SPB, and SPG are arranged in this order in the Y direction. As a result, the subpixels SPR are arranged in an oblique direction intersecting the X direction and the Y direction. Similarly, the subpixels SPG are aligned in the oblique direction, and the subpixels SPB are aligned in the oblique direction.

The color filters CFR, CFG, and CFB are arranged in a dot pattern (island pattern) with respect to the subpixels SPR, SPG, and SPB.

And, for example, gaps GP are formed between the color filter CFR and the color filter CFG, between the color filter CFG and the color filter CFB, between the color filter CFB and the color filter CFR adjacent to each other in the Y direction, and the like.

Note that the planar layout of the subpixels SPR, SPG, and SPB and the color filters CFR, CFG, and CFB is not limited to the planar layout illustrated in FIG. 3.

For example, the subpixels SPR may be arranged in the Y direction, the subpixels SPG may be arranged in the Y direction, the subpixels SPB may be arranged in the Y direction, and a line of the subpixels SPR, a line of the subpixels SPG, and a line of the subpixels SPB may be sequentially arranged in the X direction.

Figure 4:
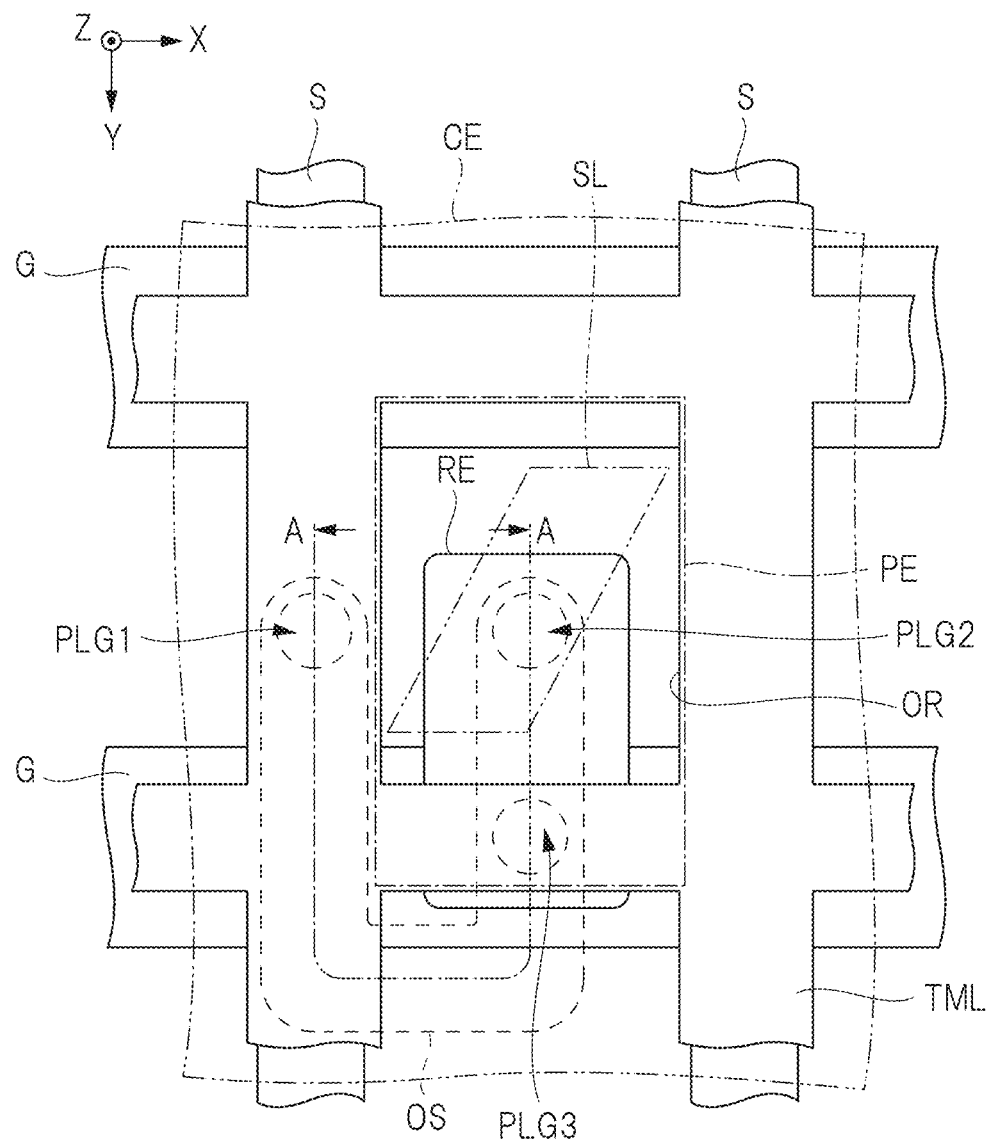
FIG. 4 is an outline plan view illustrating a part of elements configuring the subpixel.

As described above, the liquid crystal display apparatus 1 according to the present embodiment has so-called "color filter on array (COA) structure" in which all of the color filters CFR, CFG, and CFB are arranged on the array substrate SUB1. According to the "COA structure", the color filters and the subpixels are provided on the same array substrate SUB1. Thus, according to the "COA structure", the high-definition liquid crystal display apparatus 1 can be achieved without being affected by the alignment deviation between the array substrate SUB1 and the counter substrate SUB2. FIG. 4 is an outline plan view illustrating a part of elements configuring the subpixel.

FIG. 4 shows two scan lines G extending in the X direction and two signal lines S intersecting these scan lines G and extending in the Y direction. An opening region OR of the subpixel is formed in a region surrounded by the two scan lines G and the two signal lines S. In the opening region OR, the pixel electrode PE is provided so as to overlap the opening region OR in a planar manner.

A conductive film TML is arranged on the upper side of the scan line G and the signal line S. The conductive film TML includes an X-direction extending portion extending in the X direction and a Y-direction extending portion extending in the Y direction. The X-direction extending portion is provided so as to overlap the scan line G in a planar manner. On the other hand, the Y-direction extending portion is provided so as to overlap the signal line S in a planar manner. The conductive film TML has a grid-pattern planar shape made of the X-direction extending portion and the Y-direction extending portion as a whole as illustrated in FIG. 4. The conductive film TML functions as a "light shielding film" that shields light.

Next, as illustrated in FIG. 4, at a contact portion PLG1, the signal line S is connected to a semiconductor layer OS of the thin film transistor configuring the switching element. That is, the semiconductor layer OS is electrically connected to the signal line S at the contact portion PLG1. In this manner, the contact portion PLG1 has a function of electrically connecting the semiconductor layer OS and the signal line S.

Further, the semiconductor layer OS extends so as to intersect the scan line G and reach the opening region OR and is connected to a relay electrode RE at a contact portion PLG2 positioned in the opening region OR. Therefore, the semiconductor layer OS is electrically connected to the relay electrode RE via the contact portion PLG2. That is, the contact portion PLG2 has a function of electrically connecting the semiconductor layer OS and the relay electrode RE.

Further, the pixel electrode PE is provided so as to overlap the opening region OR in a planar manner, and the pixel electrode PE and the relay electrode RE are connected to each other at a bottom portion of a contact portion PLG3. That is, a part of the pixel electrode PE is formed inside the contact portion PLG3, and the part of the pixel electrode PE formed inside the contact portion PLG3 and the relay electrode RE are electrically connected to each other at the bottom portion of the contact portion PLG3. As described above, the pixel electrode PE is electrically connected to the semiconductor layer OS via the relay electrode RE. That is, the contact portion PLG3 has a function of electrically connecting the pixel electrode PE and the relay electrode RE.

Next, as illustrated in FIG. 4, for example, the common electrode CE is provided so as to overlap the entire elements such as the scan line G, the signal line S, and the conductive film TML in a planar manner. In the opening region OR, the common electrode CE is provided with the slit SL.

Here, for example, the electric field generated when the potential difference is generated between the common electrode CE and the pixel electrode PE leaks from the slit SL provided in the common electrode CE. As a result, the orientation directions of the plurality of liquid crystal molecules configuring the liquid crystal layer arranged on the upper side of the array substrate are controlled by the transverse electric field leaking from the slit SL. That is, the slit SL provided in the common electrode CE has a function of applying the transverse electric field for controlling the orientation directions of the plurality of liquid crystal molecules to the liquid crystal layer. As described above, the planar layout configuration of the subpixels is achieved.

<Cross-Sectional Configuration of Subpixel>

Figure 5:
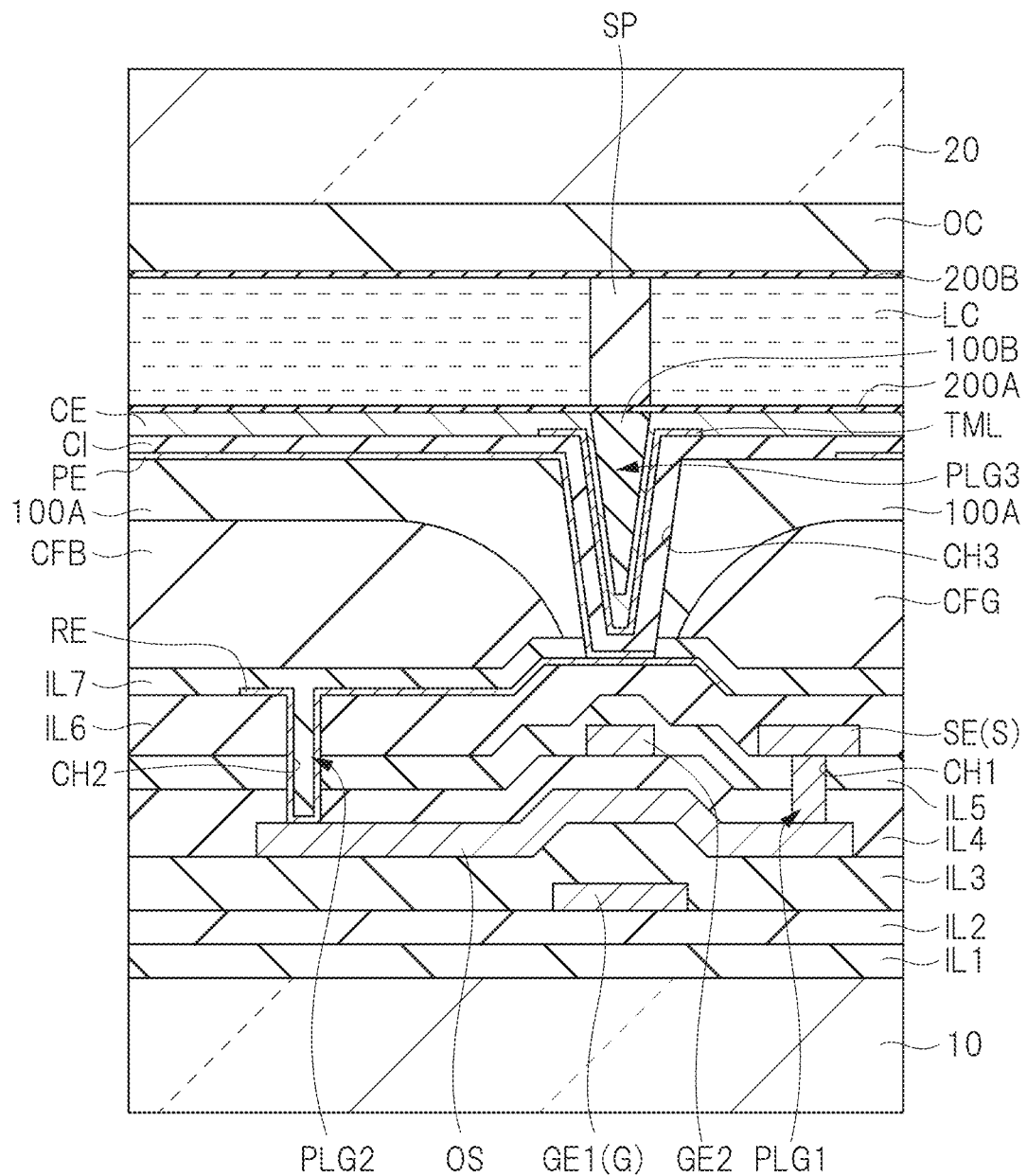
FIG. 5 is a schematic cross-sectional view taken along a line A-A in FIG. 4.

Next, a cross-sectional configuration of the subpixel will be explained. FIG. 5 is a schematic cross-sectional view taken along a line A-A in FIG. 4. Note that FIG. 5 is not a view resulted from accurate reflection of the cross section taken along the line A-A in FIG. 4 but an outline cross-sectional view. For example, although the line A-A in FIG. 4 intersects the scan line G twice, FIG. 5 shows only one scan line G (gate electrode GE1). And, although FIG. 5 shows a gate electrode GE2, FIG. 4 does not show this gate electrode GE2.

In FIG. 5, an insulating layer IL1 is formed on a substrate 10 having light transmitting property. An insulating layer IL2 is formed on the insulating layer IL1. Although the substrate 10 is made of, for example, glass, the present invention is not limited to this example. This may be made of a resin material represented by a polyimide resin. In addition, each of the insulating layer IL1 and the insulating layer IL2 is made of an inorganic insulating film represented by a silicon nitride film or a silicon oxide film.

Subsequently, as illustrated in FIG. 5, a gate electrode GE1 of the thin film transistor (field effect transistor) which is the switching element is formed on the insulating layer IL2. The gate electrode GE1 functions as the scan line G. The gate electrode GE1 is made of, for example, a metal material. The gate electrode GE1 may have a single-layer structure made of a single metal material or may have a multilayered structure in which different types of metal materials are stacked.

Next, an insulating layer IL3 is formed on the insulating layer IL2 so as to cover the gate electrode GE1. And, the semiconductor layer OS is formed on the insulating layer IL3. The insulating layer IL3 is made of, for example, an inorganic insulating film such as a silicon nitride film or a silicon oxide film. On the other hand, the semiconductor layer OS is made of an amorphous silicon film or an oxide semiconductor film.

The semiconductor layer OS functions as a channel of the thin film transistor. That is, the channel is formed in the semiconductor layer OS in accordance with a gate voltage applied to the gate electrode GE1. For example, the channel is formed in the semiconductor layer OS by application of a gate voltage equal to or larger than a threshold voltage to the gate electrode GE1. On the other hand, the channel formed in the semiconductor layer OS is disappeared by application of a gate voltage smaller than the threshold value to the gate electrode GE1.

Accordingly, on-off operations of the thin film transistor can be controlled based on the gate voltage applied to the gate electrode GE1.

For example, the semiconductor layer OS is desirably made of an oxide semiconductor film. This is because a thin film transistor using the oxide semiconductor film as the channel has advantages that are higher electron mobility than that of a thin film transistor using the amorphous silicon film as the channel and very low off-leakage current.

Next, as illustrated in FIG. 5, an insulating layer IL4 is formed on the insulating layer IL3 so as to cover the semiconductor layer OS. And, the gate electrode GE2 is formed on the insulating layer IL4. The insulating layer IL4 is made of, for example, an inorganic insulating film such as a silicon nitride film or a silicon oxide film. On the other hand, the gate electrode GE2 is made of, for example, a metal material. As described above, the thin film transistor includes the gate electrode GE1 and the gate electrode GE2 arranged so as to interpose the semiconductor layer OS from above and below. In this configuration, for example, the channel can be formed on a lower surface of the semiconductor layer OS by the application of the gate voltage equal to or larger than the threshold voltage to the gate electrode GE1 arranged on the lower side of the semiconductor layer OS, and the channel can also be formed on an upper surface of the semiconductor layer OS by the application of the gate voltage equal to or larger than the threshold voltage to the gate electrode GE2 arranged on the upper side of the semiconductor layer OS.

That is, in the thin film transistor according to the present embodiment, the channels can be formed on both the upper surface and the lower surface of semiconductor layer OS, and thus, the current driving force of the thin film transistor can be improved. However, the configuration of the thin film transistor is not limited to this example, and the gate electrode GE2 may be eliminated. Therefore, for example, FIG. 4 does not show the gate electrode GE2.

Next, an insulating layer IL5 is formed on the insulating layer IL4 so as to cover the gate electrode GE2. A source electrode SE is formed on the insulating layer IL5. The source electrode SE functions as the signal line S. The insulating layer IL5 is made of, for example, an inorganic insulating film such as a silicon nitride film or a silicon oxide film. On the other hand, the source electrode SE is made of, for example, a metal material.

Here, as illustrated in FIG. 5, in the insulating layer IL4 and the insulating layer IL5, a contact hole CH1 penetrating through these insulating layers and reaching the semiconductor layer OS is formed. At the contact hole CH1, the source electrode SE is electrically connected to the semiconductor layer OS.

Next, an insulating layer IL6 is formed on the insulating layer IL5 so as to cover the source electrode SE. The insulating layer IL6 is also made of, for example, an inorganic insulating film such as a silicon nitride film or a silicon oxide film. And, as illustrated in FIG. 5, a contact hole CH2 penetrating the insulating layer IL6, the insulating layer IL5, and the insulating layer IL4 and reaching the semiconductor layer OS is formed. At this time, the relay electrode RE is formed from the inside of the contact hole CH2 over the insulating layer IL6. The relay electrode RE is made of, for example, a light transmitting conductive material.

Next, an insulating layer IL7 is formed to cover the relay electrode RE inside the contact hole CH2 and is formed over the insulating layer IL6. The insulating layer IL7 is also made of, for example, an inorganic insulating film such as a silicon nitride film or a silicon oxide film.

As a result, the relay electrode RE is electrically connected to the semiconductor layer OS at the contact portion PLG2. In other words, the relay electrode RE is electrically connected to the drain of the thin film transistor.

And, as illustrated in FIG. 5, the color filter CFB and the color filter CFG are formed on the insulating layer IL7. As a result, in the present embodiment, the "COA structure" is achieved. Next, an organic insulating film 100A is formed so as to cover the color filter CFB and the color filter CFG. The organic insulating film 100A is made of, for example, an organic material represented by an acrylic resin. In the organic insulating film 100A and the insulating layer IL7, a contact hole CH3 penetrating the organic insulating film 100A and the insulating layer IL7 and reaching the relay electrode RE is formed. A plurality of types of components are embedded in the contact hole CH3 to configure the contact portion PLG3. In this manner, the contact portion PLG3 is electrically connected to the semiconductor layer OS (drain side) via the relay electrode RE.

Next, inside and outside configurations of the contact portion PLG3 will be explained. In FIG. 5, the relay electrode RE is provided on the insulating layer IL6, and the insulating layer IL7 is arranged so as to cover the relay electrode RE. The color filter CFB and the color filter CFG are provided on the insulating layer IL7. In order to flatten the roughness due to the color filter CFB and the color filter CFG, the organic insulating film 100A is provided so as to cover the color filter CFB and the color filter CFG.

And, as illustrated in FIG. 5, in the organic insulating film 100A, the contact penetrating the organic insulating film 100A and the insulating layer IL7 and reaching the relay electrode RE is formed. For example, the pixel electrode PE made of a light transmitting conductive material represented by ITO is formed on the inner wall of the contact hole CH3. As illustrated in FIG. 5, the pixel electrode PE is electrically connected to the relay electrode RE at the bottom portion of the contact hole CH3. Further, in the contact hole CH3, a capacitance insulating film CI being in contact with the pixel electrode PE and the inner wall of the contact hole CH3 is formed. The capacitance insulating film CI is made of, for example, a silicon nitride film. Next, the conductive film TML being in contact with the capacitance insulating film CI, the common electrode CE being in contact with the conductive film TML, and an organic insulating film 100B being in contact with the common electrode CE and filling the contact hole CH3 are formed in the contact hole CH3.

Here, the capacitance is made of the pixel electrode PE, the capacitance insulating film CI and the common electrode CE. When the potential difference is generated between the pixel electrode PE and the common electrode CE, the electric field is induced between the pixel electrode PE and the common electrode CE. Although not illustrated in FIG. 5, the common electrode CE is provided with the slit, and the orientation directions of the liquid crystal molecules are controlled based on the electric field leaking from the slit.

The common electrode CE is made of, for example, a light transmitting conductive material such as ITO. In order to reduce a resistance of the common electrode CE, the conductive film TML being in contact with the common electrode CE is provided. That is, the conductive film TML has a function of reducing the resistance of the common electrode CE.

Figure 6:
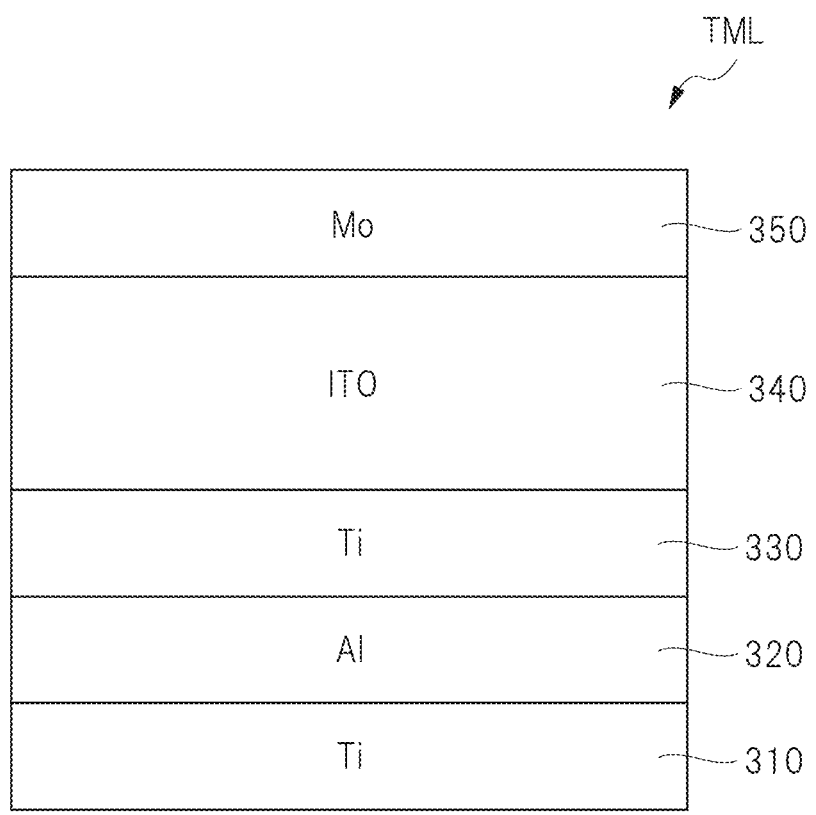
FIG. 6 is a schematic view illustrating a configuration example of a conductive film.

A configuration example of the conductive film TML will be explained below. FIG. 6 is a schematic view illustrating the configuration example of the conductive film TML.

In FIG. 6, the conductive film TML is made of a stacked film of a titanium film 310, an aluminum film 320, a titanium film 330, an ITO film 340, and a molybdenum film 350. That is, the conductive film TML is configured to include a metal film and a light transmitting conductive film (metal oxide film). For example, the titanium film 310, the aluminum film 320, the titanium film 330, and the molybdenum film 350 configuring a part of the conductive film TML are metal films having low resistance, and thus, these metal films have a function of reducing the resistance of the common electrode CE.

On the other hand, the ITO film 340 is a light transmitting conductive film and is configured such that a phase difference between light transmitted via the ITO film 340 and reflected by the titanium film 330 and light reflected by the surface of the ITO film 340 is 180 degrees. As a result, the light transmitted via the ITO film 340 and reflected by the titanium film 330 and the light reflected by the surface of the ITO film 340 are offset by interference, and as a result, the reflection of the external light is suppressed. And, as illustrated in FIG. 5, the common electrode CE is arranged to be in contact with the conductive film TML. Therefore, the common electrode CE is in contact with the molybdenum film 350 configuring the conductive film TML. In this case, the common electrode CE is made of, for example, the light transmitting conductive material such as ITO, and therefore, is configured such that a phase difference between light transmitted via the common electrode CE and reflected by the molybdenum film 350 and light reflected by the surface of the common electrode CE is 180 degrees. As a result, the light transmitted via the common electrode CE and reflected by the molybdenum film 350 and light reflected by the surface of the common electrode CE are offset by interference, and as a result, the reflection of the external light is suppressed. In this manner, the conductive film TML also has a function as an antireflection film that suppresses the reflection of the external light.

Next, in FIG. 5, the liquid crystal layer LC is arranged on the upper side of the organic insulating film 100A including the contact portion PLG3 formed therein to interpose the orientation film 200A therebetween, and the upper side of the contact portion PLG3 is provided with a spacer SP. A substrate 20 is arranged on the liquid crystal layer LC to interpose an orientation film 200B and an overcoat film OC therebetween. As described above, the cross-sectional configuration of the subpixels is achieved.

Explanation for Related Art

Next, a related art will be explained with reference to a schematic view. The "related art" described in the present specification is not a publicly-known technique but a technique that has a problem found by the present inventors, and is a technique that is a premise of the present invention.

Figure 7:
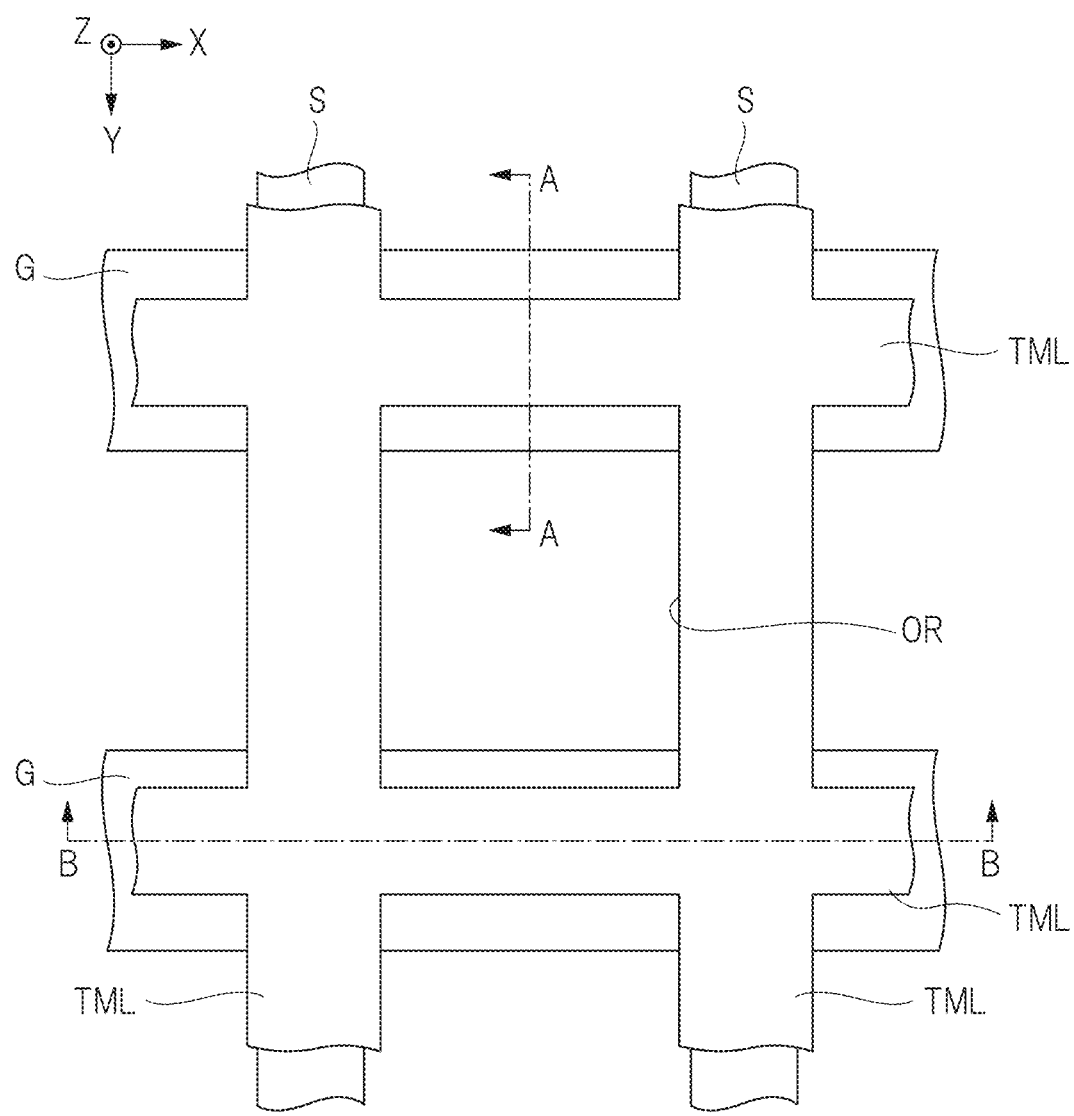
FIG. 7 is a simplified schematic view of FIG. 4 and is a view illustrating a planar layout of a scan line, a signal line and a conductive film provided on an array substrate.

FIG. 7 is a simplified schematic view of FIG. 4, and is a view illustrating a planar layout of the scan line G, the signal line S and the conductive film TML provided on the array substrate.

FIG. 7 shows two scan lines G extending in the X direction and two signal lines S intersecting these scan lines G and extending in the Y direction. The conductive film TML is arranged on the upper side of the scan line G and the signal line S. The conductive film TML includes an X-direction extending portion extending in the X direction and a Y-direction extending portion extending in the Y direction. The X-direction extending portion is provided so as to overlap the scan line G in a planar manner. On the other hand, the Y-direction extending portion is provided so as to overlap the signal line S in a planar manner. The conductive film TML has a grid-pattern planar shape made of the X-direction extending portion and the Y-direction extending portion as a whole as illustrated in FIG. 7. And, an opening region OR of the subpixel is formed in a region surrounded by the two scan lines G and the two signal lines S.

Figure 8:
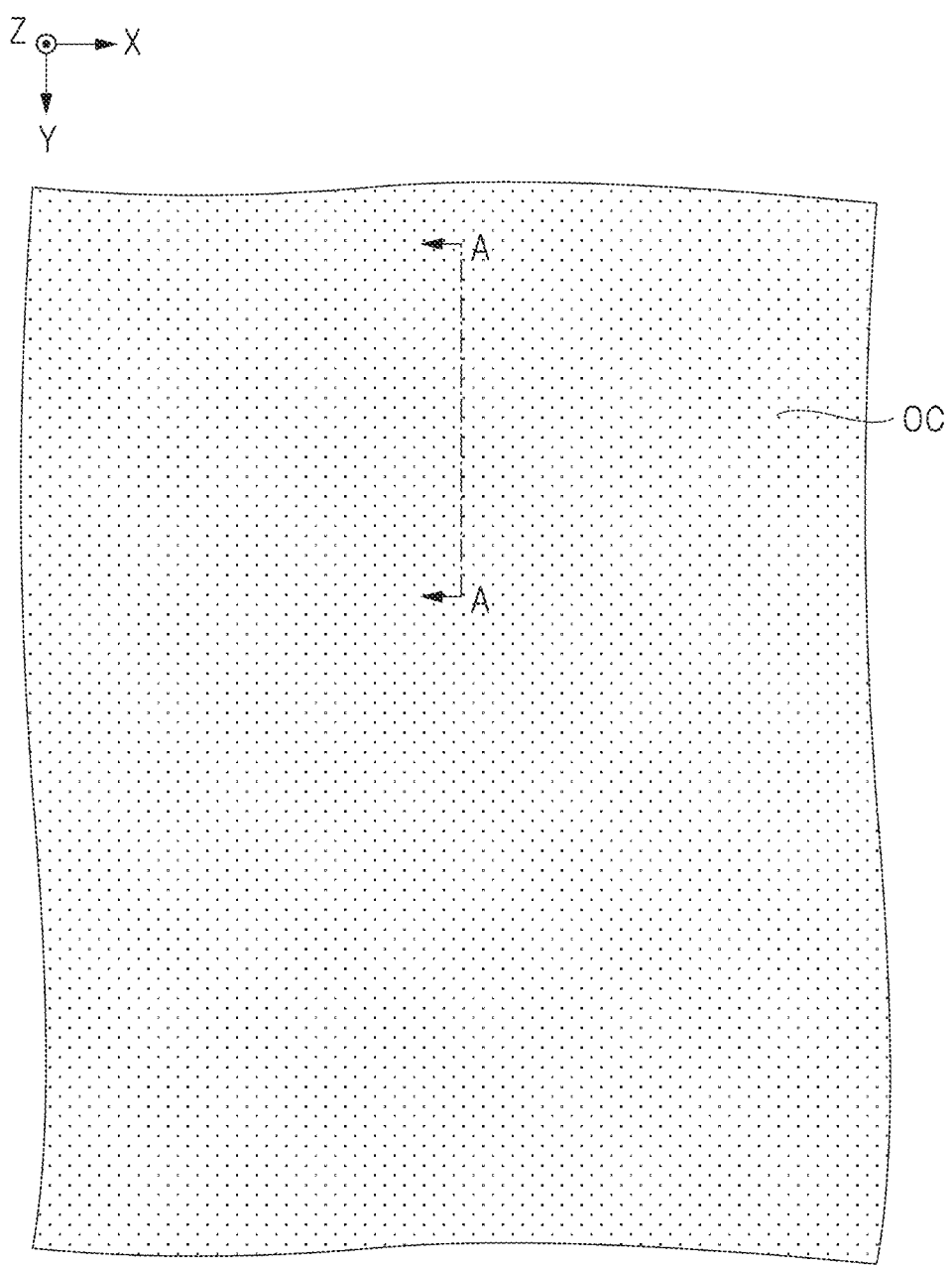
FIG. 8 is a plan view illustrating an overcoat film that is a component of a counter substrate arranged on an upper side of the array substrate.

Next, FIG. 8 is a plan view illustrating the overcoat film OC that is a component of the counter substrate arranged on the upper side of the array substrate. That is, FIG. 8 shows the overcoat film OC arranged on the upper side of the schematic view illustrated in FIG. 7. As illustrated in FIG. 8, the overcoat film OC in the related art is made of a not-patterned single film. The overcoat film OC is made of, for example, a light transmitting resin material such as acrylic resin. A refractive index of the overcoat film OC in the related art is, for example, about 1.5.

In the present specification, a film having a refractive index of about 1.5 is referred to as "low-refractive-index film" while a film having a refractive index equal to or higher than 1.7 and equal to or lower than 1.9 is referred to as "high-refractive-index film". In this case, it can be said that the overcoat film OC in the related art is a not-patterned single low-refractive-index film. Note that each of the substrate 10 and the substrate 20 is, for example, a glass substrate, and a refractive index of the glass substrate is about 1.5. That is, it can be said that the "high-refractiveindex film" is a film having a higher refractive index than a refractive index of each of the substrate 10 and the substrate 20. On the other hand, it can be said that the overcoat film OC in the related art is a film having nearly the same refractive index than the refractive index of each of the substrate 10 and the substrate 20.

Figure 9:
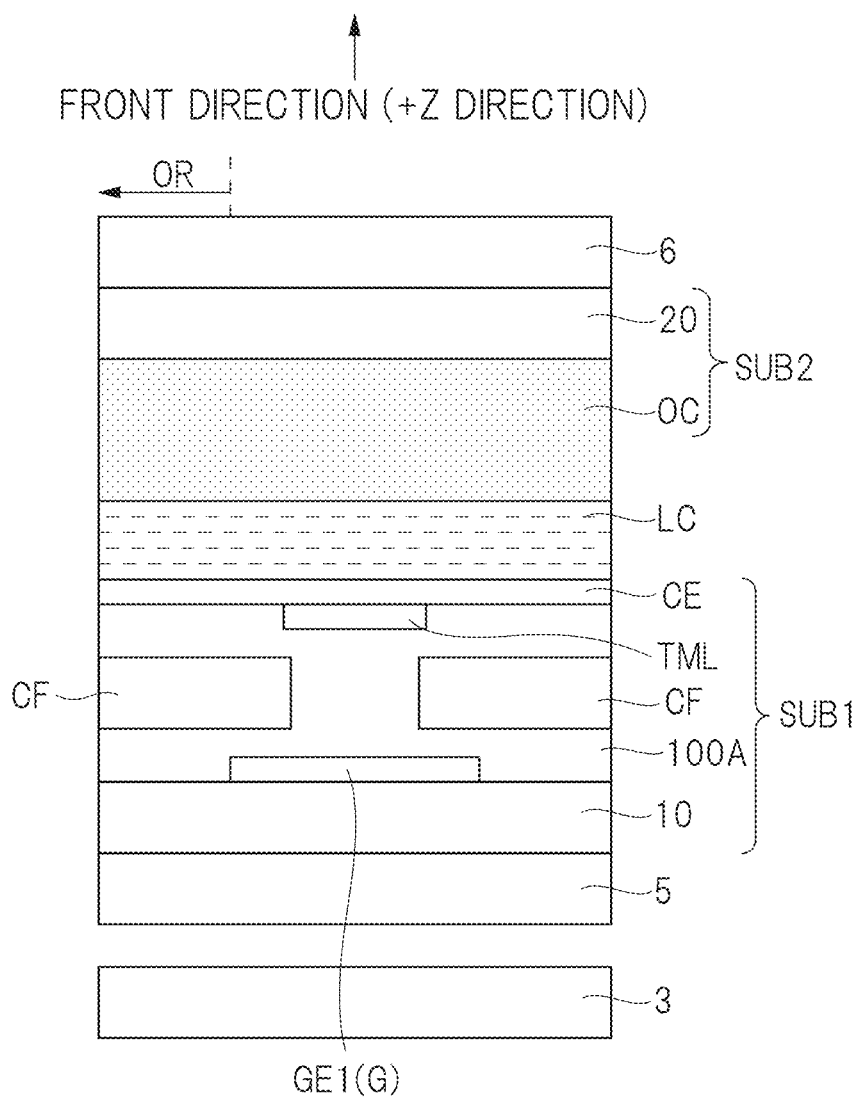
FIG. 9 is a schematic cross-sectional view taken along a line A-A in FIG. 7 and a line A-A in FIG. 8.

FIG. 9 is a schematic cross-sectional view taken along a line A-A in FIG. 7 and a line A-A in FIG. 8. In FIG. 9, the array substrate SUB1 is arranged on the upper side of the backlight 3, and the counter substrate SUB2 is arranged to face this array substrate SUB1. As illustrated in FIG. 9, the liquid crystal layer LC is filled to seal a gap between the array substrate SUB1 and the counter substrate SUB2. The polarizer 5 is arranged between the backlight 3 and the array substrate SUB1 while the polarizer 6 is arranged on the upper side of the counter substrate SUB2.

Next, principal components of the array substrate SUB1 will be briefly explained. The array substrate SUB1 includes the substrate 10 having light transmitting property, and the gate electrode GE1 (scan line G) of the thin film transistor configuring the switching element is provided on the substrate 10. As illustrated in FIG. 9, the array substrate SUB1 includes the plurality of color filters CF separate from one another to achieve the "COA structure". The organic insulating film 100A is formed so as to cover these color filters CF. The array substrate SUB1 further includes the conductive film TML and the common electrode CE being in contact with the conductive film TML.

On the other hand, the counter substrate SUB2 includes the substrate 20 having light transmitting property and the overcoat film OC being in contact with the substrate 20. The overcoat film OC is made of, for example, a light transmitting resin material. The overcoat film OC has a function of increasing the flatness of the surface (lower surface) of the counter substrate SUB2 and a function of suppressing the impurity diffusion to the liquid crystal layer LC.

Figure 10:
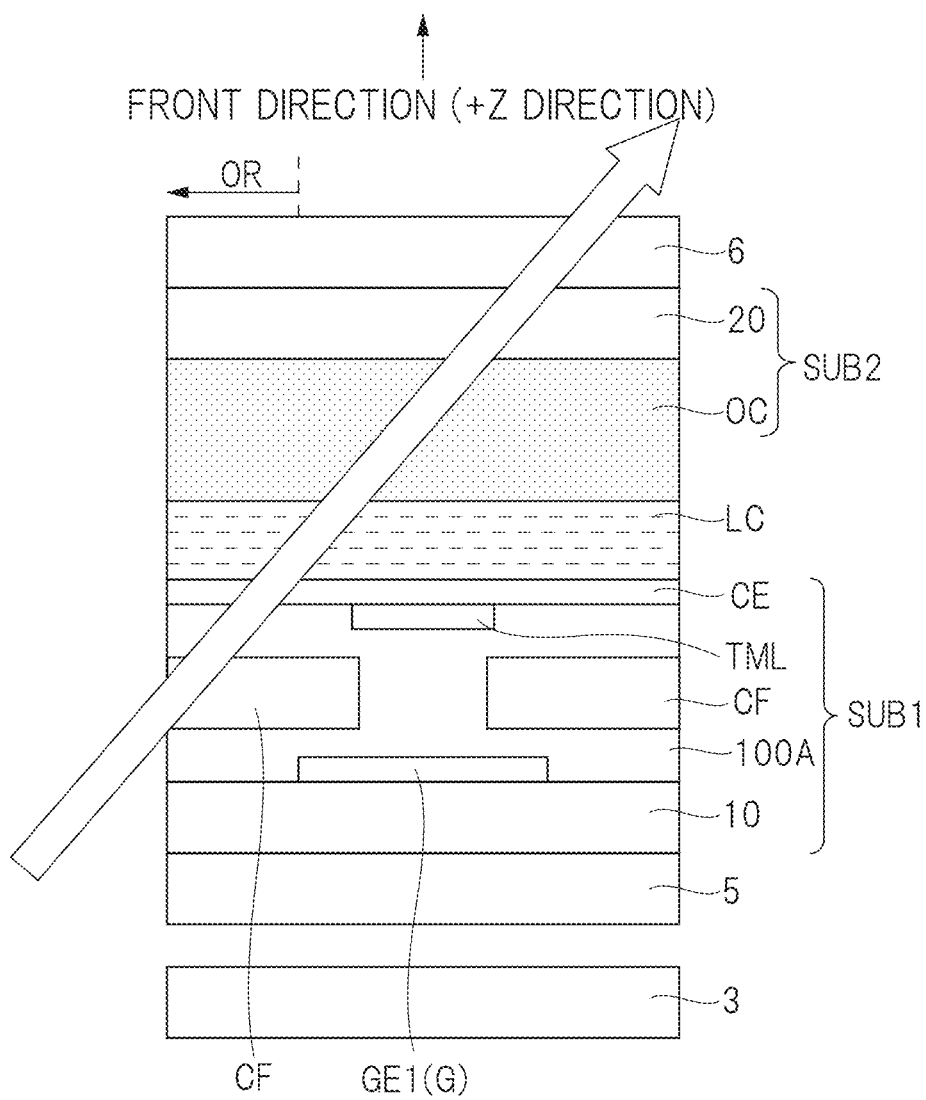
FIG. 10 is a view illustrating "oblique light".

As illustrated in FIG. 10, the related art configured as described above generates, for example, the "oblique light" travelling from the inside of the opening region OR toward the outside of the opening region OR. Therefore, in the related art, the viewing angle of the display apparatus can be secured by the "oblique light". Therefore, the related art is effectively applied to the display apparatus used in the application case in which the widening of the viewing angle is desirable.

However, types of display apparatuses include, for example, not only the display apparatus used in the application case in which the widening of the viewing angle is desirable but also a display apparatus used in an application case in which the widening of the viewing angle is not required so much. In the display apparatus used in this application case, the "oblique light" is unnecessary.

For example, in a head mounted display, an optical system in which images are formed by a lens is adopted, and therefore, the "oblique light" is unnecessary. Also in a display apparatus used for a smartphone or the like, it is often desirable to prevent a next person from taking a peek at a screen of the display apparatus. In the display apparatus meeting this demand, a narrow viewing angle is desirable.

That is, application cases of the display apparatus often include an application case in which the reduction of the "oblique light" is desirable. Therefore, in the display apparatus, it is often desirable to pay attention to not the widening of the viewing angle but the reduction of the "oblique light" to preferentially improve other performances.

Accordingly, in the present embodiment, attention is paid to the display apparatus used in the application case in which the widening of the viewing angle is not required, a devisal for not widening the viewing angle but improving luminance in a front direction is performed. That is, in the present embodiment, attention is paid to the luminance in the front direction as the performance to be improved by the reduction of the "oblique light", and an objective of the present embodiment is to improve the luminance in the front direction. A technical idea of the present embodiment with this devisal will be explained below.

Note that the "front direction" means, for example, "+Z direction" in FIG. 1, and each of FIGS. 9 and 10 shows the "front direction".

Basic Idea of Embodiment

A basic idea of the present embodiment is an idea of applying a structural devisal for changing a travelling direction of the "oblique light" to the front direction, to the overcoat film provided on the counter substrate. That is, the basic idea is an idea of applying a function of changing the travelling direction of the "oblique light" to the overcoat film. Specifically, in the basic idea, the overcoat film is made of a plurality of types of films having different refractive indexes.

According to such a basic idea, when the "oblique light" travels through the overcoat film made of the plurality of types of films having different refractive indexes, the travelling direction of the "oblique light" can be changed to the front direction, based on the change of the refractive indexes. As a result, according to the basic idea, the "oblique light" can be converted to light travelling in the front direction, and therefore, the luminance in the front direction can be improved.

For example, when each of the plurality of types of films having different refractive indexes is appropriately patterned, the travelling direction of the "oblique light" can be changed to the front direction, based on the patterned shape. As a result, according to the basic idea, the luminance in the front direction can be improved. An embodied aspect by embodying this basic idea will be explained below.

Embodied Aspect

First, a configuration of an array substrate of the embodied aspect is the same as the configuration of the array substrate of the related art. For example, even in the embodied aspect, the planar layout of the scan line G, the signal line S and the conductive film TML provided on the array substrate is as illustrated in FIG. 7.

Figure 11:
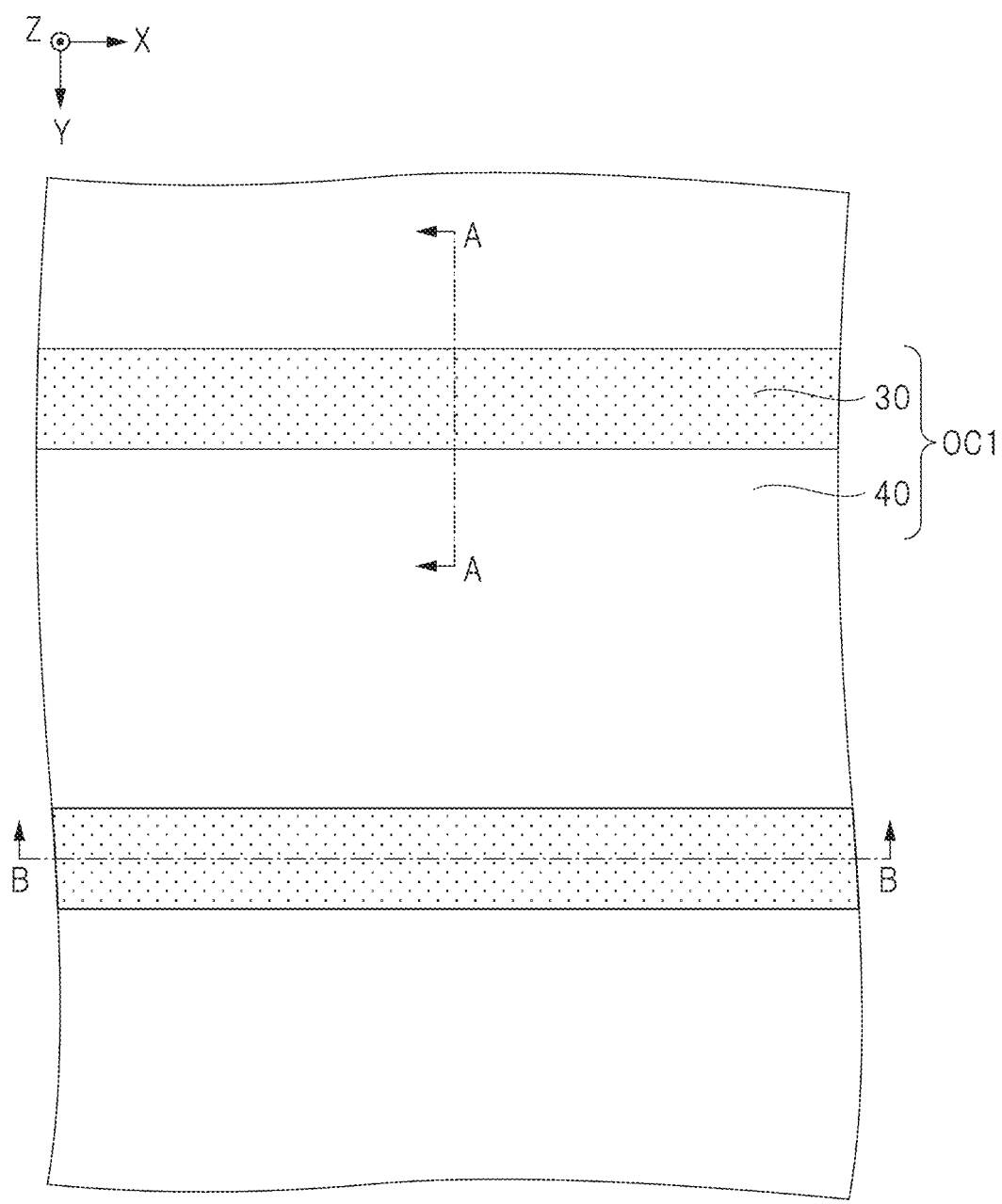
FIG. 11 is a view illustrating a planar layout of an overcoat film according to an embodied aspect.

Next, FIG. 11 is a plan view illustrating a planar layout of an overcoat film OC1 according to the embodied aspect. In FIG. 11, the overcoat film OC1 is made of a plurality of types of insulating films having different refractive indexes. Specifically, the overcoat film OC1 is made of a low-refractive-index film 30 and a high-refractive-index film 40. The low-refractive-index film 30 is made of, for example, acrylic resin, and its refractive index is about 1.5. On the other hand, the high-refractive-index film 40 is made of, for example, siloxane-based resin, and its refractive index is equal to or higher than 1.7 and equal to or lower than 1.9.

In this case, each of the low-refractive-index film 30 and the high-refractive-index film 40 is patterned. For example, as illustrated in FIG. 11, a planar shape of the low-refractive-index film 30 is a stripe shape in which grooves are arranged in the Y direction and each of the grooves extends in the X direction. As seen from combination of FIGS. 7 and 11, the low-refractive-index film 30 is provided so as to overlap the scan line G and the conductive film TML in plan view. On the other hand, the high-refractive-index film 40 is patterned so as to be arranged between the grooves of the stripe shape of the low-refractive-index film 30. As described above, the overcoat film OC of the embodied aspect is configured to include the patterned low-refractive-index film 30 and the patterned high-refractive-index film 40.

Figure 12:
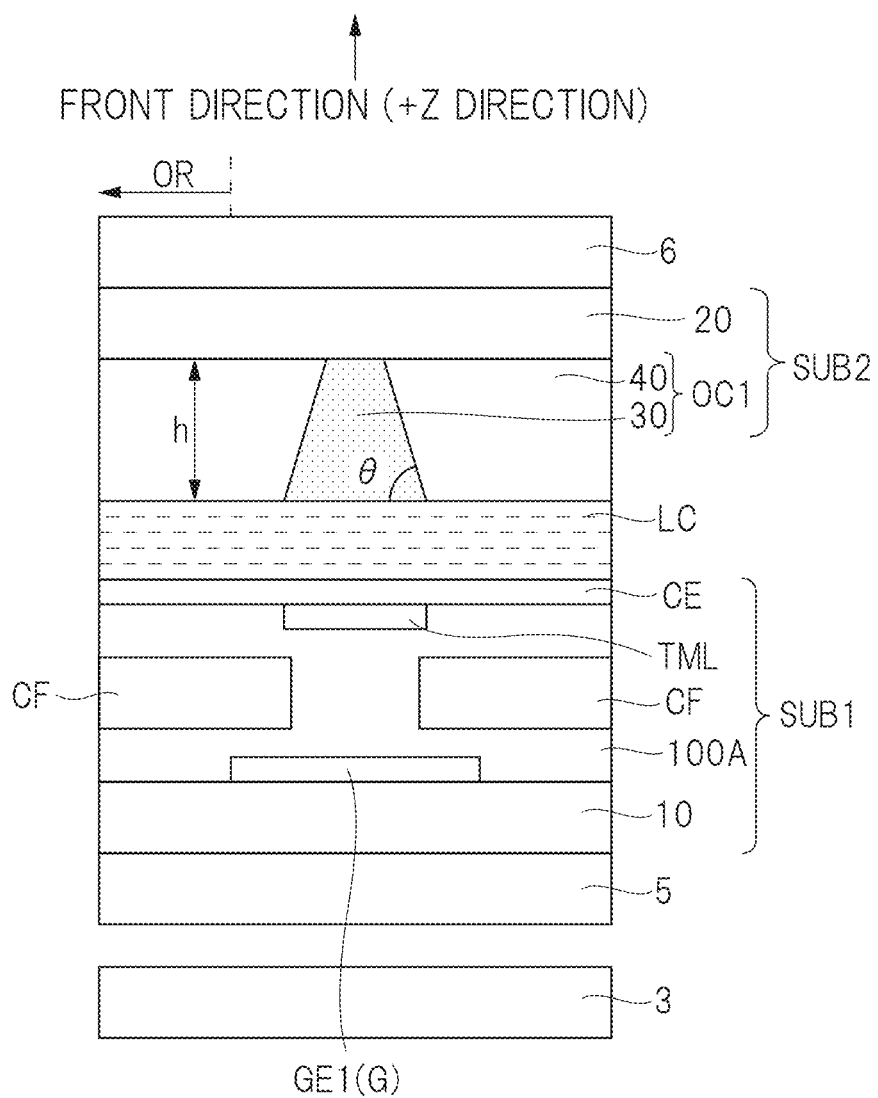
FIG. 12 is a schematic cross-sectional view taken along a line A-A in FIG. 7 and a line A-A in FIG. 11.

FIG. 12 is a schematic cross-sectional view taken along a line A-A in FIG. 7 and a line A-A in FIG. 11. In FIG. 12, explanation for the same configuration as that of FIG. 9 will be omitted.

The display apparatus includes the array substrate SUB1 including the switching element and the counter substrate SUB2 facing the array substrate SUB1. In this case, the counter substrate SUB2 includes the substrate 20 having light transmitting property and the overcoat film OC1 being in contact with the substrate 20.

The overcoat film OC1 includes the low-refractive-index film 30 and the high-refractive-index film 40. In this case, as illustrated in FIG. 12, the high-refractive-index films 40 are arranged to interpose the low-refractive-index film 30 therebetween, and the low-refractive-index film 30 is provided on the upper side of the gate electrode GE1 (scan line G) that is the component of the switching element. Further, in the cross-sectional view illustrated in FIG. 12, a cross-sectional shape of the low-refractive-index film 30 is a taper shape. That is, the cross-sectional shape of the low-refractive-index film 30 is a trapezoidal shape. If a taper angle of the taper shape is assumed to "e" while a thickness of the overcoat film OC1 in the Z direction is assumed to "h", for example, the "θ" is "θ=45 degrees" while the "h" is "h=3 μm".

The fact that the cross-sectional shape of the low-refractive-index film 30 is the taper shape is rephrased as follows. It can be said that the low-refractive-index film 30 has a first surface (upper surface) being in contact with the substrate 20 and a second surface (lower surface) opposite to the first surface such that an area of the second surface is larger than an area of the first surface.

As described above, the overcoat film OC1 of the embodied aspect is configured to include the low-refractive-index film 30 and the high-refractive-index film 40 having different refractive indexes from each other, and each of the low-refractive-index film 30 and the high-refractive-index film 40 is patterned. The overcoat film OC1 configured as described above can be formed by, for example, the following method.

First, the high-refractive-index film 40 is applied onto the substrate 20. Then, the high-refractive-index film 40 is patterned by a photolithography technique and an etching technique. The high-refractive-index film 40 is patterned to form, for example, the stripe pattern made of a plurality of grooves arranged in the Y direction and extending in the X direction.

Next, the low-refractive-index film 30 is applied onto the high-refractive-index film 40 such that insides of the plurality of grooves configuring the stripe pattern are filled with the low-refractive-index film 30. Then, the unnecessary low-refractive-index film 30 formed on the high-refractive-index film 40 is removed. This manner can form the overcoat film OC1 in which only the insides of the plurality of grooves (stripe pattern) in the high-refractive-index film 40 are filled with the low-refractive-index film 30.

Figure 13:
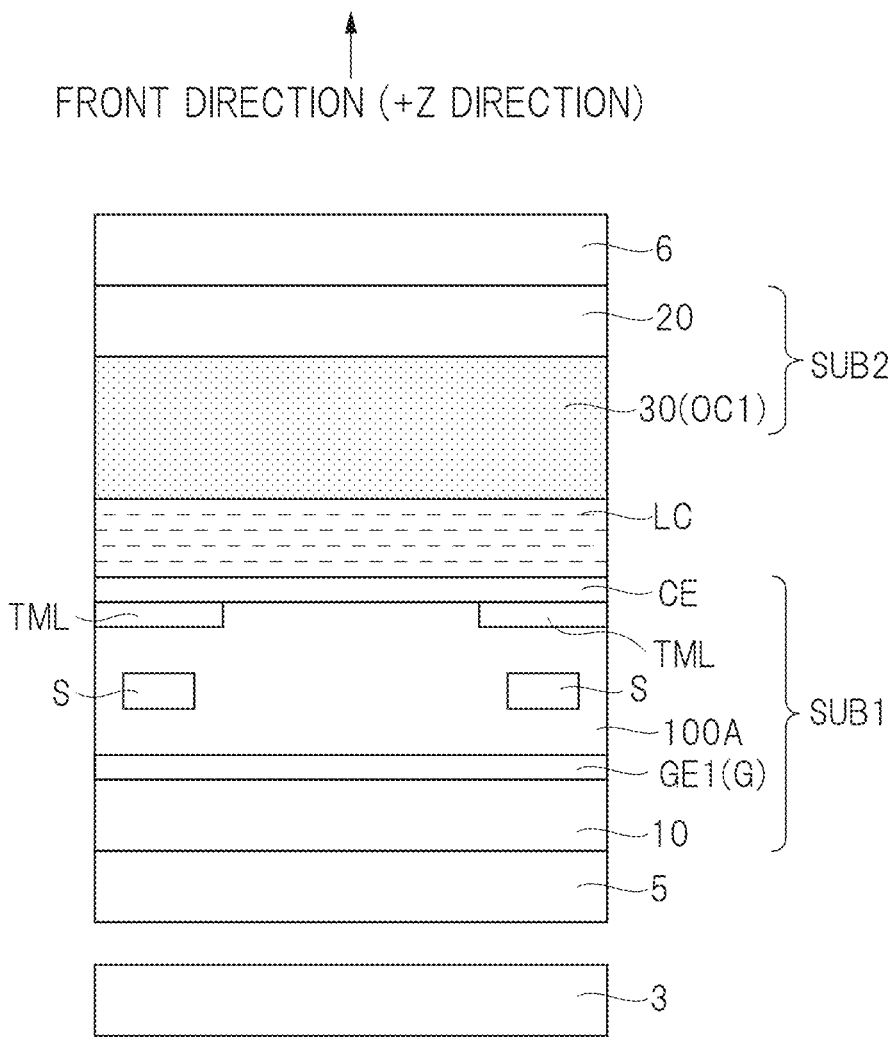
FIG. 13 is a schematic cross-sectional view taken along a line B-B in FIG. 7 and a line B-B in FIG. 11.

FIG. 13 is a schematic cross-sectional view taken along a line B-B in FIG. 7 and a line B-B in FIG. 11. In FIG. 13, the signal line S is arranged on the upper side of the gate electrode GE1 (scan line G). The conductive film TML is provided on the upper side of the signal line S.

The counter substrate SUB2 is arranged on the upper side of the array substrate SUB1 so as to interpose the liquid crystal layer LC therebetween. The counter substrate SUB2 includes the overcoat film OC1. For example, as illustrated in FIGS. 11 and 12, the overcoat film OC1 of the embodied aspect is made of the plurality of types of insulating films having different refractive indexes that are the low-refractive-index film 30 and the high-refractive-index film 40. However, FIG. 13 (the cross-sectional view taken along the line B-B in FIG. 11) shows only the low-refractive-index film 30. As described above, the embodied aspect by embodying the basic idea is achieved.

Feature of Embodied Aspect

Figure 14:
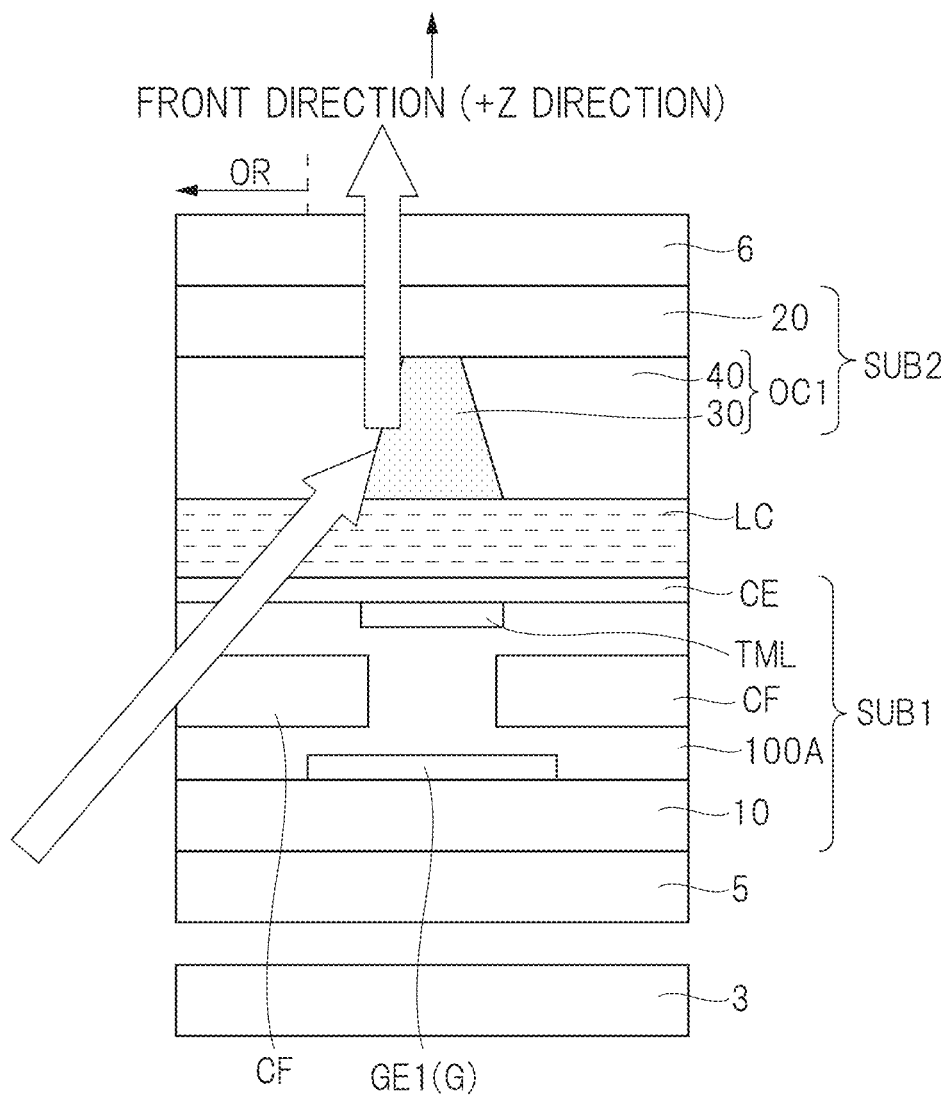
FIG. 14 is a view for explaining change of a travelling direction of the "oblique light".

Next, a feature point of the embodied aspect will be explained. As illustrated in FIG. 14, the feature point of the embodied aspect is that, for example, the overcoat film OC1 provided on the counter substrate SUB2 is made of the low-refractive-index film 30 and the high-refractive-index film 40 having different refractive indexes while the low-refractive-index film 30 is arranged so as to be interposed by the high-refractive-index films 40. In other words, the feature point is that the overcoat film OC1 is made of the low-refractive-index film 30 and the high-refractive-index film 40, each of which is patterned such that the low-refractive-index film 30 is interposed by the high-refractive-index films 40. In this case, for example, as illustrated in FIG. 14, a cross-sectional shape of the low-refractive-index film 30 interposed by the high-refractive-index films 40 is desirably the taper shape (trapezoidal shape).

Therefore, as illustrated in FIG. 14, according to the embodied aspect, the "oblique light" having entered the overcoat film OC1 is reflected on a boundary surface (that is an oblique surface of the taper shape) between the low-refractive-index film 30 and the high-refractive-index film 40, due to the difference in the refractive index. As a result, according to the embodied aspect, the travelling direction of the "oblique light" can be changed to the front direction. Therefore, according to the embodied aspect, the "oblique light" can be converted to the light travelling in the front direction, and thus, the luminance in the front direction can be improved. That is, since the embodied aspect adopts the feature point being that the overcoat film OC1 is made of the patterned low-refractive-index film 30 and high-refractive-index film 40, the "oblique light" can be reflected and converted to the light travelling in the front direction.

As described above, since the embodied aspect adopts the feature point, the "oblique light" that is unnecessary in the display apparatus used in the application case in which the viewing angle is not required can be effectively applied in order to improve the luminance in the front direction. Therefore, the feature point of the embodied aspect is effectively applied to the display apparatus used in the application case in which the viewing angle is not required.

First Modification Example

Figure 15:
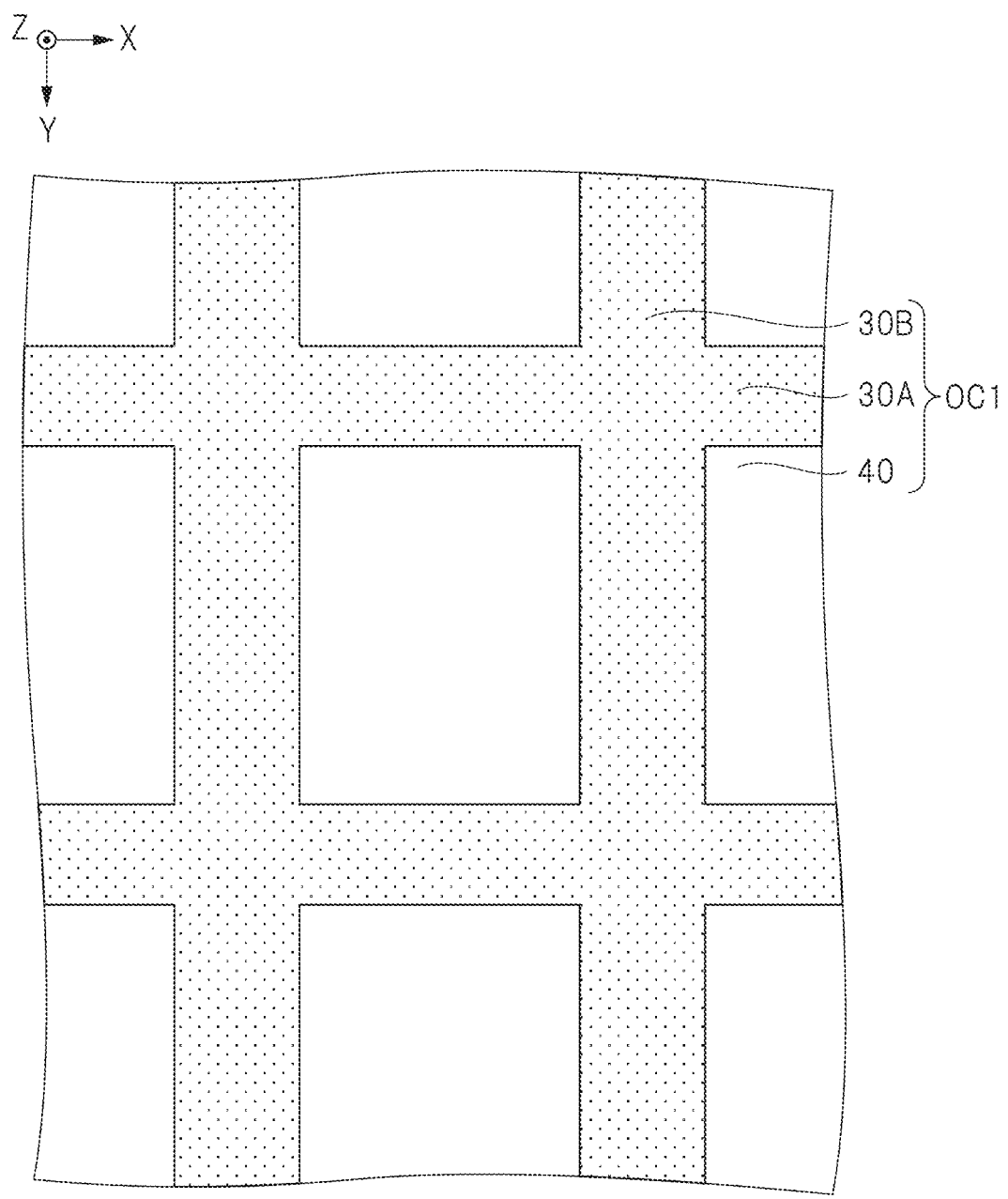
FIG. 15 is a plan view illustrating an overcoat film that is a component of a counter substrate arranged on an upper side of the array substrate according to a first modification example.

Next, the present first modification example will be explained. FIG. 15 is a plan view illustrating the overcoat film OC1 that is the component of the counter substrate arranged on the upper side of the array substrate. That is, FIG. 15 shows the overcoat film OC1 arranged on the upper side of the schematic view illustrated in FIG. 7.

As illustrated in FIG. 15, in the present first modification example, the overcoat film OC1 is made of a low-refractive-index film 30A, a low-refractive-index film 30B and the high-refractive-index film 40. In this case, the low-refractive-index film 30A is patterned to have a stripe shape in which grooves are arranged in the Y direction and each of the grooves extends in the X direction. Similarly, the low-refractive-index film 30B is patterned to have a stripe shape in which grooves are arranged in the X direction and each of the grooves extends in the Y direction.

Therefore, as illustrated in FIG. 15, a planar shape of combination of the low-refractive-index film 30A and the low-refractive-index film 30B is made of a grid shape. As seen from combination of FIGS. 7 and 15, the low-refractive-index film 30A extends in the X direction so as to overlap the scan line G and the conductive film TML while the low-refractive-index film 30B extends in the Y direction so as to overlap the signal line S and the conductive film TML in plan view.

On the other hand, the high-refractive-index film 40 is patterned so as to be arranged in gaps of the combined shape (grid shape) made of the low-refractive-index film 30A and the low-refractive-index film 30B. That is, the high-refractive-index film 40 is provided to fill the gaps of the grid shape. Therefore, the overcoat film OC1 of the present first modification example is configured to include the patterned low-refractive-index films 30A and 30B and the patterned high-refractive-index film 40.

In the present first modification example configured as described above, boundary surfaces on which the "oblique light" is reflected include not only a boundary surface between the high-refractive-index film 40 and the low-refractive-index film 30A but also a boundary surface between the high-refractive-index film 40 and the low-refractive-index film 30B. Therefore, according to the present first modification example, the number of the boundary surfaces on which the travelling direction of the "oblique light" is changed to the front direction can be made more than that of the embodied aspect (see FIG. 11). This means that the present first modification example can increase an amount of the light travelling in the front direction generated by causing the travelling direction of the "oblique light" to be changed on the boundary surfaces. Therefore, according to the present first modification example, the luminance in the front direction can be further improved.

Second Modification Example

Next, the present second modification example will be explained. In the embodied aspect, the display apparatus having the so-called "COA structure" in which the color filters are provided on the array substrate has been explained. However, the technical idea of the present embodiment is widely applicable also to the display apparatus in which the color filters are provided on the counter substrate.

However, in the display apparatus in which the color filters are provided on the counter substrate, black matrix is arranged. Therefore, even if the "oblique light" is reflected and converted to the light travelling in the front direction, a part of the light travelling in the front direction is shielded by the black matrix. Therefore, although the luminance in the front direction can be improved by the application of the technical idea of the present embodiment even to the present second modification example, the larger effects can be provided by the application of the technical idea of the present embodiment to the display apparatus having the "COA structure".

In other words, in the case of the application of the technical idea of the present embodiment to the display apparatus having the "COA structure", the counter substrate does not include the black matrix. Therefore, the light travelling in the front direction converted from the "oblique light" by the overcoat film made of the low-refractive-index film and the high-refractive-index film is not shielded by the black matrix. As a result, in the case of the application of the technical idea of the present embodiment to the display apparatus having the "COA structure", the larger effects can be provided in a viewpoint of the improvement of the luminance in the front direction.

In the scope of the idea of the present invention, various modification examples and alteration examples could have been easily anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the idea of the present invention.

In addition, it would be understood that, among other operations and effects caused by the aspects described in the embodiments, clear operations and effects from the present specification or operations and effects appropriately conceived by those skilled in the art are obviously brought by the present invention.

What is claimed is:

1. A display apparatus comprising:
an array substrate including a switching element;
a scan line connected to a gate of the switching element and a signal line connected to a source of the switching element;
a counter substrate facing the array substrate; and
a liquid crystal layer disposing between the array substrate and the counter substrate,
wherein the counter substrate includes:
a substrate having a light transmitting property;
an overcoat film on the substrate; and
an orientation film arranged on the overcoat film and in contact with the liquid crystal layer,
wherein the overcoat film includes a first insulating film having a first refractive index and a second insulating film having a second refractive index,
wherein the second refractive index is lower than the first refractive index,
wherein the second insulating film is provided along the scan line, and
wherein the second insulating film is patterned in stripe.

2. The display apparatus according to claim 1,
wherein the second insulating film includes:
a first surface being in contact with the substrate; and
a second surface opposite to the first surface, and
an area of the second surface is larger than an area of the first surface.

3. The display apparatus according to claim 1,
wherein a color filter is provided on the array substrate.

4. The display apparatus according to claim 1,
wherein a color filter is provided on the counter substrate.

* * * * *